United States Patent
Moeller

[11] 3,812,810
[45] May 28, 1974

[54] CONTROLLED EXPANSION MARINE PLUG

[75] Inventor: Axel Moeller, St. Petersburg Beach, Fla.

[73] Assignee: Moeller Manufacturing Co., Inc., Greenville, Miss.

[22] Filed: Mar. 2, 1973

[21] Appl. No.: 337,291

[52] U.S. Cl.................. 114/197, 215/54, 220/24.5
[51] Int. Cl............................................ B63b 13/00
[58] Field of Search .......... 114/183, 184, 185, 197, 114/198; 220/24.5; 215/53, 54; 251/189, 191; 85/70, 71

[56] References Cited
UNITED STATES PATENTS

| | | | |
|---|---|---|---|
| 1,114,625 | 10/1914 | Metcalf | 215/54 |
| 2,245,887 | 6/1941 | Wikander | 220/24.5 |
| 2,978,138 | 4/1961 | Moeller | 215/54 |
| 3,018,751 | 1/1962 | Spurlock | 114/197 |
| 3,065,725 | 11/1962 | Koroly | 114/185 |
| 3,349,944 | 10/1967 | Moeller | 220/24.5 |
| 3,673,913 | 7/1972 | Barry | 85/70 |

FOREIGN PATENTS OR APPLICATIONS
5,064   12/1879   Great Britain...................... 215/54

*Primary Examiner*—Duane A. Reger
*Assistant Examiner*—Galen L. Barefoot
*Attorney, Agent, or Firm*—Berman, Bishoff & Platt

[57] ABSTRACT

A bailer plug is described comprising a resilient compressible stopper body having resilient sealing ribs, in which the grooves between the ribs are of reduced height so as to provide quicker purchase on the interior of the thimble in which the plug is inserted. The threaded stem, attached to a turning handle, engages a threaded plate having upstanding fingers received in slots in a lower compression plate and in corresponding slots in the lower portion of the resilient compressible stopper body. This arrangement prevents overturning with consequent rubber flow over the end of the plug and loss of the seal. In order to prevent leakage of water through the plug, an O-ring of compressible material is provided between the upper compression plate and the stem.

5 Claims, 6 Drawing Figures

PATENTED MAY 28 1974　　　　　　　　　　　　3,812,810
FIG. 1.　　FIG. 2.　　FIG. 3.
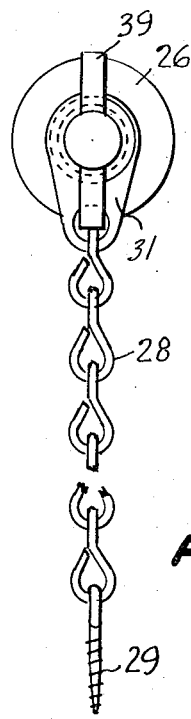
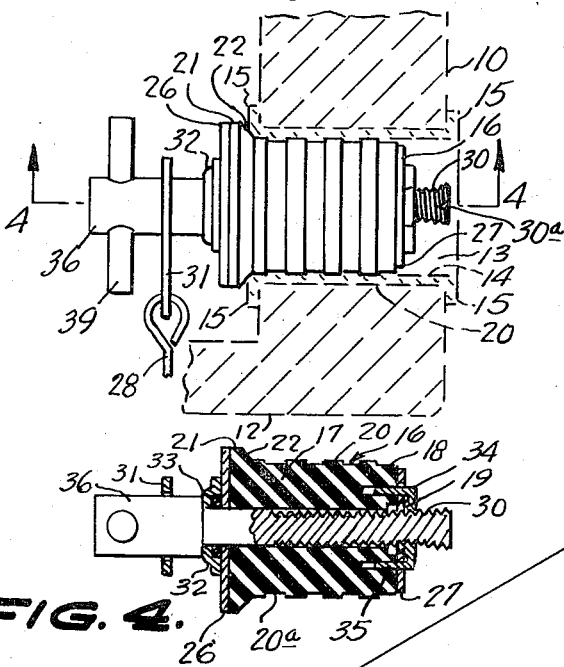
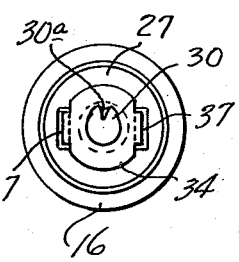
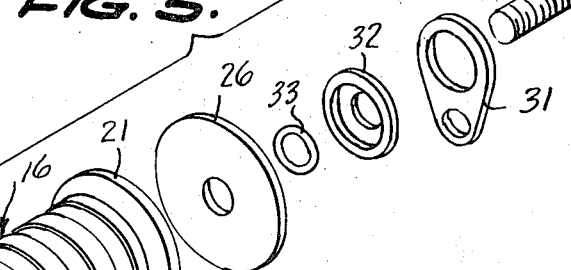
FIG. 4.
FIG. 5.
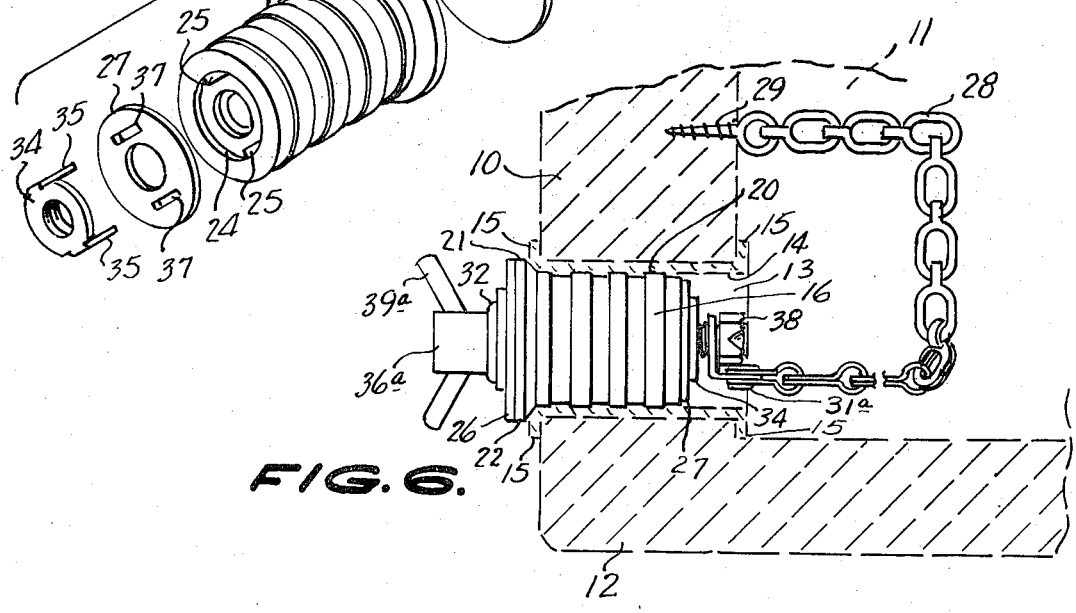
FIG. 6.

CONTROLLED EXPANSION MARINE PLUG

FIELD OF THE INVENTION

This invention relates to expanding stoppers and plugs and more particularly to an improved removable plug for the drain openings in small boats.

SUMMARY OF THE INVENTION

In prior art bailer plugs, which are utilized in small boats to plug the drain openings therein, it has been found that problems have arisen with respect to the leakage of water through the plug, resulting in undesired quantities of water entering the interior of the boat. In addition, it has been found with prior art bailer plugs, that there was a tendency to overturn the plug when it was inserted in the thimble provided for receiving the plug. This resulted in rubber flowing over the end of the plug and reduced the purchase on the inner surface of the thimble with the consequent loss of the desired seal.

The first of the above-stated problems in the prior art is solved in the present invention by providing an O-ring seal on the handle fitting between the top of the plug and the stem. The overturning problem, as stated above, is solved in the present invention by providing a threaded plate at the bottom of the plug for threadedly receiving the lower portion of the threaded stem. The threaded plate has two upstanding fingers which mate with slots provided in the bottom compression plate and aligned pockets in the resilient compressible stopper body. This arrangement of components prevents the handle from being overturned and at the same time prevents rubber from flowing over the end of the threaded stem. In order to more quickly achieve the desired purchase on the inner surface of the thimble and thus reduce the tendency to overturn, the grooves between the resilient sealing ribs provided on the outer surface of the stopper body, are of reduced height and relatively shallow.

BRIEF DESCRIPTION OF THE DRAWINGS

FIG. 1 is an end elevational view of a first embodiment of the present invention;

FIG. 2 is a front elevational view of the present invention, illustrating the method of installation in a boat;

FIG. 3 is an end elevational view, as seen from the right in FIG. 2;

FIG. 4 is a cross-sectional view, taken on the line 4—4 in FIG. 2, looking in the direction of the arrows;

FIG. 5 is an exploded perspective view, illustrating the major components of the present invention;

FIG. 6 is a front elevational view, similar to FIG. 2, showing a second embodiment of the present invention installed in a boat.

DETAILED DESCRIPTION OF THE INVENTION

Referring now to the drawings and in particular FIGS. 1 through 5 thereof, there is illustrated a preferred embodiment of the present invention. As illustrated, the boat to which the controlled expansion plug of the present invention is applied comprises a transom or stern board 10 and a bottom 12. The transom 10 has bored therein, adjacent to the bottom 12, drain opening 13. The drain opening 13 has fitted therein a metal thimble or sleeve 14 and the opposite ends of thimble or sleeve are upset, as at 15, against the opposite faces of the transom 10. The aforedescribed construction is standard and forms no part of the present invention.

The improved plug of the present invention comprises a resilient compressible stopper body 16 having a cylindrical side wall 17 and a bottom wall 18. The plug body contains an axial bore 19, in order to receive threaded stem 30, as will be more fully described hereinbelow. The outer surface of the side wall 17 is provided at equidistantly spaced points with resilient sealing ribs 20 having disposed therebetween grooves 20a. In order to provide a faster purchase on the interior surface of thimble 14 when the plug is tightened in a manner to be described below, grooves 20a are formed relatively shallow in depth as compared with those in the prior art plugs.

The extreme outer end of the stopper body 16 is provided with an annular skirt 21, the inner face 22 of which is tapered to seat within the upset end 15 of thimble 14. The outer surface of the end wall 18 is recessed, as at 24, around bore 19. Also formed in the bottom wall 18 are inwardly extending slots or pockets 25 for receiving fingers or lugs 35 integrally formed with threaded plate 34.

The opposite ends of the resilient compressible stopper body 16 are confined respectively between inner and outer compression plates 26 and 27.

Outer compression plate 27 is formed with slots 37 arranged to align with inwardly extending slots or pockets 25 in stopper body 16 and receive fingers 35 on lower threaded plate 34.

When the plug is assembled, stem 30 threadedly engages plate 34. Cross bar 39 is provided in operating handle 36 of stem 30, so that clockwise turning of the handle will draw the plate 34 toward the handle and consequently force compression plates 26 and 27 toward one another, compressing stopper body 16. Grooves 20a in stopper body 16 are relatively shallow so that, as the stopper body is compressed, purchase on the inside of thimble 14 will be quickly attained.

As can best be seen in FIGS. 4 and 5, O-ring 33 of resilient compressible material such as rubber, neoprene or the like, is designed to seat within concave washer 32 and provide a seal between the adjacent end of the plug and the stem, thus eliminating any leakage through the plug.

Plate 31 is provided for securing chain 28 thereto, having screw eye 29 at the opposite end thereof. Screw eye 29 can be threaded into the transom to prevent loss of the plug from the boat.

The embodiment of the invention illustrated in FIGS. 1 through 5 is designed to be mounted so that operating handle 36 of the plug is located interiorly of the boat. The end of threaded stem 30 is provided with a crimp lock 30a, to prevent disassembly of the component parts of the plug when operating handle 36 is turned by means of cross bar 39.

In the embodiment illustrated in FIG. 6, the component parts are essentially the same as the above-described embodiment, except that operating handle 36a is designed to be located externally of the boat. Cross bar 39a is bent rather than being straight, as shown in FIG. 2, so that it will not interfere with the performance of the plug or snap debris. Plate 31a is formed in a right angle configuration so as to accommodate nut 38 which threadedly engages the end of threaded stem 30 and is staked or jammed to prevent disassembly of the component parts. In this embodiment of the invention, the drain plug, when disengaged from thimble 14, will hang outside of transom 10. Thus, the boat may be drained, with the plug hanging behind, while it is mounted on a trailer and being conveyed from dockside to another location.

There has thus been described a new and improved bailer plug for boats which offers the unique advantages of preventing flow of rubber over the end thereof with consequent loss of the seal, by use of the mating parts included threaded plate 34, washer 27 having slots 37 therein for receiving fingers 35 and pockets 25 in stopper body 16. By providing grooves 20a of reduced height, a quicker purchase is secured on the interior of thimble 14 resulting in a faster seal and eliminating the tendency to overturn. In addition, the utilization of O-ring 33, held in place by concave washer 32, results in a seal between the top of the plug and the stem to prevent leakage through the plug.

While preferred embodiments of the invention have been shown and described, it will be apparent to those skilled in the art that modifications may be made therein without departing from the spirit and intent of the invention. It is, therefore, intended that the scope of the present invention be construed only in accordance with the claims appended hereinbelow.

I claim:

1. An improved bailer plug comprising in combination:
   a. a resilient compressible stopper body having a longitudinal bore therethrough;
   b. a threaded stem extending through said bore;
   c. an upper compression plate disposed at the upper surface of said body;
   d. a lower compression plate at the lower surface of said body;
   e. said lower compression plate having diametrically opposed slots therein;
   f. a plate threadedly engaging said stem and having upwardly extending fingers passing through said slots and engaging the interior of said body, so that when said stem is turned, said compression plates are drawn together; and
   g. sealing means for preventing leakage through said body compressing an O-ring formed of resilient stem and disposed above said upper compression plate and concave washer means surrounding said stem and said O-ring for retaining said O-ring in place.

2. The bailer plug set forth in claim 1, wherein said body includes inwardly extending pockets for receiving said fingers.

3. The bailer plug set forth in claim 1, wherein said body comprises resilient sealing ribs for engaging the inner face of a thimble, said ribs being separated by grooves.

4. The bailer plug set forth in claim 3, wherein said grooves are relatively shallow.

5. The bailer plug set forth in claim 4, further including means for attaching the plug to a boat.

* * * * *

UNITED STATES PATENT OFFICE
CERTIFICATE OF CORRECTION

Patent No. 3,812,810                     Dated May 28, 1974

Inventor(s) Axel Moeller

It is certified that error appears in the above-identified patent and that said Letters Patent are hereby corrected as shown below:

Column 4, delete Line 14 and substitute the following:

--body comprising an O-ring formed of resilient compressible material surrounding said--

Signed and sealed this 31st day of December 1974.

(SEAL)
Attest:

McCOY M. GIBSON JR.                     C. MARSHALL DANN
Attesting Officer                       Commissioner of Patents